(12) United States Patent
Rousse et al.

(10) Patent No.: US 8,404,310 B2
(45) Date of Patent: Mar. 26, 2013

(54) THERMOSET DAMPENER MATERIAL (75) Inventors: Martine Rousse, Drusenheim (FR);
Ludovic Valette, Shanghai (CN)

(73) Assignee: Dow Global Technologies LLC,
Midland, MI (US)

( * ) Notice: Subject to any disclaimer, the term of this patent is extended or adjusted under 35 U.S.C. 154(b) by 475 days.

(21) Appl. No.: 12/668,825

(22) PCT Filed: Jul. 28, 2008

(86) PCT No.: PCT/US2008/071302
§ 371 (c)(1),
(2), (4) Date: Jan. 12, 2010

(87) PCT Pub. No.: WO2009/018194
PCT Pub. Date: Feb. 5, 2009

(65) Prior Publication Data
US 2010/0193725 A1 Aug. 5, 2010

Related U.S. Application Data (60) Provisional application No. 60/962,995, filed on Aug. 2, 2007.

(51) Int. Cl.
*B05D 3/02* (2006.01)
(52) U.S. Cl. ..................... 427/384; 427/385.5
(58) Field of Classification Search ........................ None
See application file for complete search history.

(56) References Cited

U.S. PATENT DOCUMENTS

| | | | |
|---|---|---|---|
| 2,750,395 A | 6/1956 | Phillips et al. | |
| 2,890,194 A | 6/1959 | Phillips et al. | |
| 3,984,604 A | 10/1976 | King et al. | |
| 4,447,493 A * | 5/1984 | Driscoll et al. | 428/332 |
| 4,734,485 A | 3/1988 | Bartmann et al. | |
| 5,064,884 A | 11/1991 | Kohler et al. | |
| 5,112,932 A | 5/1992 | Koenig et al. | |
| 5,122,588 A | 6/1992 | Koch et al. | |
| 5,374,668 A | 12/1994 | Kanemura et al. | |
| 5,385,990 A | 1/1995 | Abbey et al. | |
| 5,405,688 A | 4/1995 | Decker et al. | |
| 5,462,996 A | 10/1995 | Portelli et al. | |
| 5,741,824 A * | 4/1998 | Butschbacher et al. | 427/195 |
| 6,011,122 A | 1/2000 | Puyenbroek | |

(Continued)

FOREIGN PATENT DOCUMENTS

| | | |
|---|---|---|
| DE | 265409 | 3/1989 |
| EP | 0906927 | 10/1997 |

(Continued)

OTHER PUBLICATIONS

"Innovative pipe coating material and process for high tempreature fields," Sauvant-Maynot et al, Oil & Gas Science and Technology (2002), 57(3) pp. 269-279.

(Continued)

*Primary Examiner* — Erma Cameron
(74) *Attorney, Agent, or Firm* — Brooks, Cameron & Huebsch PLLC (57) ABSTRACT

Thermoset compositions useful for dampening vibrations at elevated temperatures are disclosed. The thermoset compositions may have a glass transition temperature of 1500 C. or greater, a tan δ peak of 0.2 or greater, and a tan δ peak width measured at half-height larger than about 400 C., each as measured by dynamic mechanical thermal analysis (DMTA) at a frequency of 1 Hz. The thermoset compositions may be used to dampen vibrations at temperatures in excess of 100° C.

6 Claims, 1 Drawing Sheet

U.S. PATENT DOCUMENTS

| | | | |
|---|---|---|---|
| 6,153,719 | A | 11/2000 | Abbey et al. |
| 6,194,495 | B1 | 2/2001 | Yeager |
| 6,207,786 | B1 | 3/2001 | Ishida et al. |
| 6,239,232 | B1 | 5/2001 | Camberlin et al. |
| 6,277,903 | B1 * | 8/2001 | Sophiea et al. ............ 523/428 |
| 6,403,229 | B2 | 6/2002 | Yeager |
| 6,403,684 | B1 | 6/2002 | Jin et al. |
| 6,548,608 | B2 | 4/2003 | Camberlin et al. |
| 6,572,971 | B2 | 6/2003 | Martin et al. |
| 6,620,474 | B1 * | 9/2003 | Regnier et al. ............ 428/35.7 |
| 6,632,893 | B2 | 10/2003 | Konarski et al. |
| 6,753,365 | B2 | 6/2004 | Brown |
| 6,894,102 | B2 | 5/2005 | Merfeld |
| 7,026,411 | B1 | 4/2006 | Carter et al. |
| 7,037,958 | B1 | 5/2006 | Hansen et al. |
| 7,115,681 | B2 | 10/2006 | Shimo-Ohsako et al. |
| 2003/0065057 | A1 | 4/2003 | Choi et al. |
| 2005/0009980 | A1 | 1/2005 | Swedo et al. |
| 2005/0054787 | A1 | 3/2005 | Swedo et al. |
| 2005/0171237 | A1 | 8/2005 | Patel et al. |
| 2006/0293172 | A1 | 12/2006 | Rubinsztajn et al. |

FOREIGN PATENT DOCUMENTS

| | | |
|---|---|---|
| EP | 0915118 A1 | 11/1998 |
| EP | 1225203 | 7/2002 |
| EP | 1566394 | 8/2005 |
| EP | 1568733 | 8/2005 |
| JP | 58124647 | 7/1983 |
| JP | 04120160 | 4/1992 |
| JP | 10251380 | 9/1998 |
| JP | 11071568 | 3/1999 |
| JP | 2005007783 | 1/2005 |
| JP | 2005126473 | 5/2005 |
| JP | 2006049374 | 2/2006 |
| WO | 97/47689 | 12/1997 |
| WO | 9900451 | 1/1999 |
| WO | 01/03879 | 5/2001 |

OTHER PUBLICATIONS

Polyimide-modified epoxy system: time-tempreature-transfomation diagrams, mechanical and thermal properties, Biolley et al., Polymer (1994) 35 (3) pp. 558-564.

"Prepartion and Charcterization of thermoplastic/thermosetting polyimide blends," Yamamoto et al. SAMPE Journal (1985), 21 (4), pp. 6-10.

Database WPI Week 200620 Thomson Scientific, London, GB; AN 2006-187543 XP002495593 & JP 2006049374 A, Matsushita Electric Works Ltd, Feb. 16, 2006, 1 page.

Database WPI Week 200511 Thomson Scientific, London, GB; AN 2005-094677 XP002495594 & JP 2005007783 A, Japan Composite KK, Jan. 13, 2005, 4 pages.

Database WPI Week 199848 Thomson Scientific, London, GB; AN 1998-563228 XP002495595 & JP 10251380 A, Hitachi Chem Co Ltd, Sep. 22, 1998, 2 pages.

Database WPI Week 199222 Thomson Scientific, London, GB; AN 1992-180952 XP002495596 & JP 04120160 A, Toho Rayon KK, Apr. 21, 1992, 1 page.

Database WPI Week 198335 Thomson Scientific, London, GB; AN 1983-750600 XP002495597 & JP 58124647 A, Dainippon Ink & Chem KK, Jul. 25, 1983, 2 pages.

International Search Report & Written Opinion from related PCT application PCT/US2008/071302, dated Sep. 23, 2008, 10 pages.

International Preliminary Report on Patentability related PCT application PCT/US2008/071302, dated Feb. 2, 2010, 8 pages.

Nalwa, "Polyquinoline/bismaleimide bends as low-dielectric constant materials", Proceedings—Electrochemical Society, vol. 98-6, 1999, 135-144.

* cited by examiner

THERMOSET DAMPENER MATERIAL

CROSS REFERENCE TO RELATED APPLICATIONS

This is a §371 application of PCT International Patent Application Number PCT/US2008/071302 filed Jul. 28, 2008, and claims priority from provisional application Ser. No. 60/962,995 filed Aug. 2, 2007, each of which is incorporated herein by reference in its entirety.

BACKGROUND OF DISCLOSURE

1. Field of the Disclosure

Embodiments disclosed herein relate generally to thermosetting systems for dampening vibrations. More specifically, embodiments disclosed herein relate to thermosetting systems for dampening vibrations at high temperatures.

2. Background

Dampener materials commonly used in the transportation and aerospace industry include rubber materials, bituminous pads, and other similar materials. These materials are typically only effective at dampening vibrations at low temperatures, most often at room temperature.

However, parts used in the transportation and aerospace industry are often subjected to mechanical vibrations at high temperatures. In particular, vibration dampening at temperatures in excess of 150° C. is very difficult to achieve.

There exists a need for thermoset compositions useful for vibration dampening at elevated temperatures. As illustrated by the following references, there exists various materials having high glass transition temperatures or that are stable at high temperatures.

For example, high temperature thermoplastic compositions are disclosed in "Creep behaviour of polymer blends based on epoxy matrix and intractable high $T_g$ thermoplastic," C. Gauthier et al., Polymer International (2004), 53(5), pages 541-549. Compositions disclosed include a dispersion of crosslinked thermoset epoxy-amine in a thermoplastic polyetherimide matrix. Similarly, high temperature (>140° C.) corrosion protective coatings including high $T_g$ thermoplastic and thermoset epoxyamine monomers are disclosed in "Innovative pipe coating material and process for high temperature fields," Sauvant-Maynot et al., Oil & Gas Science and Technology (2002), 57(3), pages 269-279.

A material for microelectronics packaging having a low dielectric constant and high thermal stability is disclosed in "Polyquinoline/bismaleimide blends as low-dielectric constant materials," Nalwa et al., Proceedings—Electrochemical society (1999), 98-6 (Electrochemical Processing in ULSI Fabrication I and Interconnect and Contact Metallization: Materials, Processes, and Reliability), pages 135-144.

A hot-melt processable thermoset composition prepared by blending tetraglycidyl-4,4'-diaminodiphenylmethane/4, 4'-diaminodiphenyl sulfone epoxy resin and a high $T_g$ thermoplastic polyimide is disclosed in "Polyimide-modified epoxy system: time-temperature-transformation diagrams, mechanical and thermal properties," Biolley et al, Polymer (1994), 35(3), pages 558-564. The consequences of the thermoplastic incorporation, such as a polyimide concentration of 10 weight percent, were a slight increase in $T_g$ and limited improvements in stress at rupture and strain-energy release rate Glc compared to the unmodified epoxy matrix.

Thermoplastic/thermosetting polyimide blends containing polyimide PI 2080 (I) [62181-46-8] and N,N'-(methylenedi-p-phenylene)bismaleimide are disclosed in "Preparation and characterization of thermoplastic/thermosetting polyimide blends," Yamamoto et al, SAMPE Journal (1985), 21(4), pages 6-10. The blends are heated at temperatures greater than 180° C. to form a co-continuous composite thermoplastic-thermoset structure having high glass transition temperatures (greater than 300° C.). Carbon fabric- and glass fabric-reinforced blends maintained their mechanical properties at temperatures less than 260° C.

EP 1225203 discloses use of thermoplastic additives with high glass transition temperatures (140° C. to 220° C.) in thermosetting compositions. Modified polyoxyphenylenes dissolved in styrene were used in glass fiber-reinforced thermosetting compositions based on unsaturated maleic acid resins.

U.S. Pat. Nos. 6,103,810 and 6,268,425 disclose alloys formed from mixed alkali pyrophosphate glass and high temperature organic thermoplastic or thermosetting polymers having working temperatures which are compatible with that of the glass and/or the precursor glass. The glass and polymers are combined at the working temperature to form an intimate mixture of an essentially uniform, fine grained microstructure.

EP 382575 discloses a co-continuous thermoplastic-thermoset crosslinked blend, such as a siloxane-polyimide prepared by the reaction of bis[4-(3-aminophenoxy)phenyl]sulfone, 9,9-bis(aminophenyl)fluorine, an amine-terminated polydimethylsiloxane, and biphenyltetracarboxylic dianhydride blended with resorcinol diglycidy ether, phenol novalac resin, and 4,4'-diaminodiphenyl sulfone, the mixture of which is cured at 130° C. for 2 hours and at 180° C. for two hours. Fiber reinforced structures formed from the cured resins disclosed have a glass transition temperature ($T_g$) of at least 120° C., among other properties.

JP 2005126473 discloses an ethylene copolymer rubber composition having good dynamic fatigue at high temperatures. The heat-resistant dampening rubber composition is obtained by premixing of (b) 50-85 wt. % of a hydrogenated nitrile rubber having $\leq 80$ iodine value with (c) 50-15 wt. % of zinc methacrylate [with the proviso that the sum total of the (b) and (c) is 100 wt. %]. The resultant mixture in an amount of 2-200 parts by weight is then mixed with (a) 100 parts by weight of an ethylene-α-olefinic copolymer rubber and 2-20 parts by weight of an organic peroxide cross-linking agent so as to make (c) the zinc methacrylate which is used as a reinforcing agent unevenly distributed in (b) the hydrogenated nitrile rubber having $\leq 80$ iodine value.

JP 11071568 discloses adhesive compositions including (A) 0.1-20 wt. % of a non-liquid crystalline resin such as a nylon resin, e.g. nylon 66, nylon 6 or a nylon copolymer containing the nylon 66 or nylon 6 as a main component, (B) 80-99.9 wt. % of a liquid-crystalline resin, and preferably (C) an inorganic filler having a weight-average major axis or weight-average fiber length of 100-400 μm, a $\leq 60$ μm major axis or fiber length filler content of 10-50 wt. % based on the total amount of all the fillers, and an average thickness or average fiber diameter of 5-15 μm in an amount of 5-300 parts per 100 parts by weight of the total amount of the components A and B. The compositions are high in strength, excellent in moldability, heat resistance, toughness, oil resistance, gasoline resistance, abrasion resistance, molded product surface smoothness, high temperature rigidity, dimensional stability and vibration-dampening characteristics and high in strength by including a non-liquid crystalline resin and a liquid-crystalline resin in a specific ratio.

U.S. Pat. No. 6,822,067 discloses polycyanates and polycyanate/epoxide combinations that are useful as laminating resins. The resulting thermosetting polycyanate copolymers have a high proportion of triazine structures and glass transition temperatures up to about 200° C.

Compositions or blends having high glass transition temperature materials or materials that are stable at high temperatures may be described in the references above. However, there is a lack of vibration dampening materials that are effective at elevated temperatures.

Accordingly, there exists a need for thermoset dampener materials effective a dampening vibrations when used at elevated temperatures.

SUMMARY OF THE DISCLOSURE

In one aspect, embodiments disclosed herein relate to a process for dampening vibrations in an article. The process may include: disposing a thermoset composition on a substrate to form a composite; the thermoset composition having: a glass transition temperature of 150° C. or greater, a tan δ peak of 0.2 or greater, and a tan δ peak width measured at half-height larger than about 40° C., each as measured by dynamic mechanical thermal analysis (DMTA) at a frequency of 1 Hz; exposing the composite to vibrations at temperatures of 100° C. or greater.

In another aspect, embodiments disclosed herein relate to composites having improved dampening properties at elevated temperatures. The composites may include: a thermoset composition disposed on a substrate; the thermoset composition having: a glass transition temperature of 150° C. or greater, a tan δ peak of 0.2 or greater, and a tan δ peak width measured at half-height larger than about 40° C., each as measured by dynamic mechanical thermal analysis (DMTA) at a frequency of 1 Hz; wherein the composite is exposed to vibrations at temperatures of 100° C. or greater.

In other aspects, embodiments disclosed herein relate to thermoset compositions having improved dampening properties at elevated temperatures. The thermoset compositions may include: a reaction product of a curable composition comprising at least one thermosetting resin and at least one hardener; wherein the thermoset composition has: a glass transition temperature of 150° C. or greater, a tan δ peak of 0.2 or greater, and a tan δ peak width measured at half-height larger than about 40° C., each as measured by dynamic mechanical thermal analysis (DMTA) at a frequency of 1 Hz.

Other aspects and advantages will be apparent from the following description and the appended claims.

DETAILED DESCRIPTION

In one aspect, embodiments disclosed herein relate to thermosetting compositions for use as dampener materials at elevated temperatures. In other aspects, embodiments disclosed herein relate to dampener materials having a high glass transition temperature and a high dampening factor. In more specific aspects, embodiments disclosed herein relate to thermoset dampener materials having a glass transition temperature of at least 150° C. and a high dampening factor defined by tan δ greater than 0.2 with a peak width at half-height of at least 40° C. Such dampener materials may be useful for transportation, aerospace, castings, coatings, and electronics/electrical applications requiring high service temperature dampening.

Embodiments of the dampener materials for reducing the effect of vibrations at elevated temperatures may include compositions based upon thermosetting resins capable of generating a crosslinked network upon curing. Vibrations that may be effectively reduced include vibrations between 0 and 10,000 Hz in some embodiments; between 0 and 3000 Hz in other embodiments; and between 0 and 500 Hz in yet other embodiments.

In various embodiments, thermosetting resins may include epoxy resins, phenolic resins or resins capable of generating phenolic moieties at high temperature, vinylic resins, cycloaliphatic epoxy resins, nitrogen containing resins such as cyanate ester based resins, as well as other thermosetting compositions, or mixtures thereof. Dampener materials may also include various additives, including other resins such as high temperature resistant thermoplastics. Additionally, curable compositions for forming the thermoset dampener materials may include hardeners and catalysts.

For example, thermosetting dampener materials disclosed herein may include at least one thermosetting resin, and optionally at least one of a hardener, a catalyst, an inorganic filler, a fibrous reinforcement, a high temperature resistant thermoplastic resin, and a solvent. In various embodiments, following cure of the thermosetting composition, the cured composition may have at least one of a glass transition temperature of at least 150° C., a high dampening factor defined by tan δ greater than 0.2 with a peak width at half-height of at least 40° C., as measured by dynamic mechanical thermal analysis (DMTA) at a frequency of 1 Hz. The cured composition may be attached to an article to reduce the interference vibration of the article at temperatures greater than 100° C.

The glass transition temperature of the cured composition may be higher than about 150° C. in some embodiments; higher than about 170° C. in other embodiments; higher than about 180° C. in other embodiments; higher than about 200° C. in other embodiments; lower than about 300° C. in other embodiments; lower than about 280° C. in other embodiments; and lower than about 260° C. in yet other embodiments, as measured using DMTA at a frequency of 1 Hz.

The height of the tan δ peak of the cured composition is higher than about 0.2 in some embodiments; higher than about 0.25 in other embodiments; higher than about 0.3 in other embodiments; and higher than about 0.35 in yet other embodiments, as measured using DMTA at a frequency of 1 Hz.

The width of the tan δ peak of the cured composition is larger than about 40° C. when measured at half-height for some embodiments of the cured compositions disclosed herein; larger than about 50° C. in other embodiments; and larger than about 60° C. in yet other embodiments.

In other embodiments, a shoulder or a secondary tan δ peak is shown by the cured composition when measured by DMTA. The shoulder of the secondary tan δ peak may be at a lower or higher temperature than the primary tan δ peak. In some embodiments, the secondary tan δ peak is located at more than about 10° C. from the main tan δ peak; more than about 20° C. from the main tan δ peak in other embodiments; more than about 30° C. from the main tan δ peak in other embodiments; less than about 150° C. from the main tan δ peak in other embodiments; less than about 100° C. from the main tan δ peak in other embodiments; and less than about 80° C. from the main tan δ peak in yet other embodiments.

Dampener materials disclosed herein may reduce the vibrations observed at a temperature higher than about 100° C. in some embodiments; higher than about 120° C. in other embodiments; higher than about 150° C. in other embodiments; higher than about 180° C. in other embodiments; and higher than about 200° C. in yet other embodiments.

The thermoset dampener materials disclosed herein may be attached to an article or substrate by any suitable means. For example, thermoset dampener materials disclosed herein may be attached to an article by coating, spraying, dipping, casting, potting, laminating, gluing, and sandwiching. In some embodiments, the uncured composition is disposed on a substrate and cured in place to produce a modified article with reduced vibration at high temperatures.

As described above, thermoset dampener materials described herein may include one or more thermosetting resins, such as epoxy resins, phenolic resins, vinylic resins, cyanate ester resins, and others. Dampener materials may also include various additives, such as high temperature resistant thermoplastics, among other additives. Each of these will be described in more detail below.

Epoxy Resin

The epoxy resins used in embodiments disclosed herein may vary and include conventional and commercially available epoxy resins, which may be used alone or in combinations of two or more, including, for example, novalac resins, isocyanate modified epoxy resins, and carboxylate adducts, among others. In choosing epoxy resins for compositions disclosed herein, consideration should not only be given to properties of the final product, but also to viscosity and other properties that may influence the processing of the resin composition.

The epoxy resin component may be any type of epoxy resin useful in molding compositions, including any material containing one or more reactive oxirane groups, referred to herein as "epoxy groups" or "epoxy functionality." Epoxy resins useful in embodiments disclosed herein may include monofunctional epoxy resins, multi- or poly-functional epoxy resins, and combinations thereof. Monomeric and polymeric epoxy resins may be aliphatic, cycloaliphatic, aromatic, or heterocyclic epoxy resins. The polymeric epoxies include linear polymers having terminal epoxy groups (a diglycidyl ether of a polyoxyalkylene glycol, for example), polymer skeletal oxirane units (polybutadiene polyepoxide, for example) and polymers having pendant epoxy groups (such as a glycidyl methacrylate polymer or copolymer, for example). The epoxies may be pure compounds, but are generally mixtures or compounds containing one, two or more epoxy groups per molecule. In some embodiments, epoxy resins may also include reactive —OH groups, which may react at higher temperatures with anhydrides, organic acids, amino resins, phenolic resins, or with epoxy groups (when catalyzed) to result in additional crosslinking.

In general, the epoxy resins may be glycidated resins, cycloaliphatic resins, epoxidized oils, and so forth. The glycidated resins are frequently the reaction product of a glycidyl ether, such as epichlorohydrin, and a bisphenol compound such as bisphenol A; $C_4$ to $C_{28}$ alkyl glycidyl ethers; $C_2$ to $C_{28}$ alkyl- and alkenyl-glycidyl esters; $C_1$ to $C_{28}$ alkyl-, mono- and poly-phenol glycidyl ethers; polyglycidyl ethers of polyvalent phenols, such as pyrocatechol, resorcinol, hydroquinone, 4,4'-dihydroxydiphenyl methane (or bisphenol F), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris(4-hydroxyphynyl) methane; polyglycidyl ethers of the chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms. Other examples of epoxy resins useful in embodiments disclosed herein include bis-4,4'-(1-methylethylidene) phenol diglycidyl ether and (chloromethyl) oxirane bisphenol A diglycidyl ether.

In some embodiments, the epoxy resin may include glycidyl ether type; glycidyl-ester type; alicyclic type; heterocyclic type, and halogenated epoxy resins, etc. Non-limiting examples of suitable epoxy resins may include cresol novolac epoxy resin, phenolic novolac epoxy resin, biphenyl epoxy resin, hydroquinone epoxy resin, stilbene epoxy resin, and mixtures and combinations thereof.

Suitable polyepoxy compounds may include resorcinol diglycidyl ether (1,3-bis-(2,3-epoxypropoxy)benzene), diglycidyl ether of bisphenol A (2,2-bis(p-(2,3-epoxypropoxy)phenyl)propane), triglycidyl p-aminophenol (4-(2,3-epoxypropoxy)-N,N-bis(2,3-epoxypropyl)aniline), diglycidyl ether of bromobispehnol A (2,2-bis(4-(2,3-epoxypropoxy)-3-bromo-phenyl)propane), diglydicylether of bisphenol F (2,2-bis(p-(2,3-epoxypropoxy)phenyl)methane), triglycidyl ether of meta- and/or para-aminophenol (3-(2,3-epoxypropoxy)N,N-bis(2,3-epoxypropyl)aniline), and tetraglycidyl methylene dianiline (N,N,N',N'-tetra(2,3-epoxypropyl) 4,4'-diaminodiphenyl methane), and mixtures of two or more polyepoxy compounds. A more exhaustive list of useful epoxy resins found may be found in Lee, H. and Neville, K., Handbook of Epoxy Resins, McGraw-Hill Book Company, 1982 reissue.

Other suitable epoxy resins include polyepoxy compounds based on aromatic amines and epichlorohydrin, such as N,N'-diglycidyl-aniline; N,N'-dimethyl-N,N'-diglycidyl-4,4'-diaminodiphenyl methane; N,N,N',N'-tetraglycidyl-4,4'-diaminodiphenyl methane; N-diglycidyl-4-aminophenyl glycidyl ether; and N,N,N',N'-tetraglycidyl-1,3-propylene bis-4-aminobenzoate. Epoxy resins may also include glycidyl derivatives of one or more of: aromatic diamines, aromatic monoprimary amines, aminophenols, polyhydric phenols, polyhydric alcohols, polycarboxylic acids.

Useful epoxy resins include, for example, polyglycidyl ethers of polyhydric polyols, such as ethylene glycol, triethylene glycol, 1,2-propylene glycol, 1,5-pentanediol, 1,2,6-hexanetriol, glycerol, and 2,2-bis(4-hydroxy cyclohexyl)propane; polyglycidyl ethers of aliphatic and aromatic polycarboxylic acids, such as, for example, oxalic acid, succinic acid, glutaric acid, terephthalic acid, 2,6-napthalene dicarboxylic acid, and dimerized linoleic acid; polyglycidyl ethers of polyphenols, such as, for example, bis-phenol A, bis-phenol F, 1,1-bis(4-hydroxyphenyl)ethane, 1,1-bis(4-hydroxyphenyl)isobutane, and 1,5-dihydroxy napthalene; modified epoxy resins with acrylate or urethane moieties; glycidlyamine epoxy resins; and novolac resins.

The epoxy compounds may be cycloaliphatic or alicyclic epoxides. Examples of cycloaliphatic epoxides include diepoxides of cycloaliphatic esters of dicarboxylic acids such as bis(3,4-epoxycyclohexylmethyl)oxalate, bis(3,4-epoxycyclohexylmethyl)adipate, bis(3,4-epoxy-6-methylcyclohexylmethyl)adipate, bis(3,4-epoxycyclohexylmethyl)pimelate; vinylcyclohexene diepoxide; limonene diepoxide; dicyclopentadiene diepoxide; and the like. Other suitable diepoxides of cycloaliphatic esters of dicarboxylic acids are described, for example, in U.S. Pat. No. 2,750,395.

Other cycloaliphatic epoxides include 3,4-epoxycyclohexylmethyl-3,4-epoxycyclohexane carboxylates such as 3,4-epoxycyclohexylmethyl-3,4-epoxycyclohexane carboxylate; 3,4-epoxy-1-methylcyclohexyl-methyl-3,4-epoxy-1-methylcyclohexane carboxylate; 6-methyl-3,4-epoxycyclohexylmethylmethyl-6-methyl-3,4-epoxycyclohexane carboxylate; 3,4-epoxy-2-methylcyclohexylmethyl-3,4-epoxy-2-methylcyclohexane carboxylate; 3,4-epoxy-3-methylcyclohexyl-methyl-3,4-epoxy-3-methylcyclohexane carboxylate; 3,4-epoxy-5-methylcyclohexyl-methyl-3,4-epoxy-5-methylcyclohexane carboxylate and the like. Other suitable 3,4-epoxycyclohexylmethyl-3,4-epoxycyclohexane carboxylates are described, for example, in U.S. Pat. No. 2,890,194.

Further epoxy-containing materials which are particularly useful include those based on glycidyl ether monomers. Examples are di- or polyglycidyl ethers of polyhydric phenols obtained by reacting a polyhydric phenol with an excess of chlorohydrin such as epichlorohydrin. Such polyhydric phenols include resorcinol, bis(4-hydroxyphenyl)methane (known as bisphenol F), 2,2-bis(4-hydroxyphenyl)propane (known as bisphenol A), 2,2-bis(4'-hydroxy-3',5'-dibromophenyl)propane, 1,1,2,2-tetrakis(4'-hydroxy-phenyl) ethane or condensates of phenols with formaldehyde that are obtained under acid conditions such as phenol novolacs and cresol novolacs. Examples of this type of epoxy resin are described in U.S. Pat. No. 3,018,262. Other examples include di- or polyglycidyl ethers of polyhydric alcohols such as 1,4-butanediol, or polyalkylene glycols such as polypropylene glycol and di- or polyglycidyl ethers of cycloaliphatic polyols such as 2,2-bis(4-hydroxycyclohexyl)propane. Other examples are monofunctional resins such as cresyl glycidyl ether or butyl glycidyl ether.

Another class of epoxy compounds are polyglycidyl esters and poly(beta-methylglycidyl) esters of polyvalent carboxylic acids such as phthalic acid, terephthalic acid, tetrahydrophthalic acid or hexahydrophthalic acid. A further class of epoxy compounds are N-glycidyl derivatives of amines, amides and heterocyclic nitrogen bases such as N,N-diglycidyl aniline, N,N-diglycidyl toluidine, N,N,N',N'-tetraglycidyl bis(4-aminophenyl)methane, triglycidyl isocyanurate, N,N'-diglycidyl ethyl urea, N,N'-diglycidyl-5,5-dimethylhydantoin, and N,N'-diglycidyl-5-isopropylhydantoin.

Still other epoxy-containing materials are copolymers of acrylic acid esters of glycidol such as glycidylacrylate and glycidylmethacrylate with one or more copolymerizable vinyl compounds. Examples of such copolymers are 1:1 styrene-glycidylmethacrylate, 1:1 methyl-methacrylateglycidylacrylate and a 62.5:24:13.5 methylmethacrylate-ethyl acrylate-glycidylmethacrylate.

Epoxy compounds that are readily available include octadecylene oxide; glycidylmethacrylate; D.E.R. 331 (bisphenol A liquid epoxy resin) and D.E.R. 332 (diglycidyl ether of bisphenol A) available from The Dow Chemical Company, Midland, Mich.; vinylcyclohexene dioxide; 3,4-epoxycyclohexylmethyl-3,4-epoxycyclohexane carboxylate; 3,4-epoxy-6-methylcyclohexyl-methyl-3,4-epoxy-6-methylcyclohexane carboxylate; bis(3,4-epoxy-6-methylcyclohexylmethyl)adipate; bis(2,3-epoxycyclopentyl)ether; aliphatic epoxy modified with polypropylene glycol; dipentene dioxide; epoxidized polybutadiene; silicone resin containing epoxy functionality; flame retardant epoxy resins (such as a brominated bisphenol type epoxy resin available under the tradename D.E.R. 580, available from The Dow Chemical Company, Midland, Mich.); 1,4-butanediol diglycidyl ether of phenolformaldehyde novolac (such as those available under the tradenames D.E.N. 431 and D.E.N. 438 available from The Dow Chemical Company, Midland, Mich.); and resorcinol diglycidyl ether Although not specifically mentioned, other epoxy resins under the tradename designations D.E.R. and D.E.N. available from the Dow Chemical Company may also be used.

Epoxy resins may also include isocyanate modified epoxy resins. Polyepoxide polymers or copolymers with isocyanate or polyisocyanate functionality may include epoxy-polyurethane copolymers. These materials may be formed by the use of a polyepoxide prepolymer having one or more oxirane rings to give a 1,2-epoxy functionality and also having open oxirane rings, which are useful as the hydroxyl groups for the dihydroxyl-containing compounds for reaction with diisocyanate or polyisocyanates. The isocyanate moiety opens the oxirane ring and the reaction continues as an isocyanate reaction with a primary or secondary hydroxyl group. There is sufficient epoxy functionality on the polyepoxide resin to enable the production of an epoxy polyurethane copolymer still having effective oxirane rings. Linear polymers may be produced through reactions of diepoxides and diisocyanates. The di- or polyisocyanates may be aromatic or aliphatic in some embodiments.

Other suitable epoxy resins are disclosed in, for example, U.S. Pat. Nos. 7,163,973, 6,632,893, 6,242,083, 7,037,958, 6,572,971, 6,153,719, and 5,405,688 and U.S. Patent Application Publication Nos. 20060293172 and 20050171237, each of which is hereby incorporated herein by reference.

As described below, curing agents and toughening agents may include epoxy functional groups. These epoxy-containing curing agents and toughening agents should not be considered herein part of the above described epoxy resins.

Phenolic Resins

Phenolic resins useful in some embodiments disclosed herein may include any aldehyde condensate resins derived from aldehydes such as methanal, ethanal, benzaldehyde or furfuraldehyde and phenols such as phenol, cresols, dihydric phenols, chlorphenols and $C_{1-9}$ alkyl phenols, such as phenol, 3- and 4-cresol (1-methyl, 3- and 4-hydroxy benzene), catechol (2-hydroxy phenol), resorcinol (1,3-dihydroxy benzene) and quinol (1,4-dihydroxy benzene). In some embodiments, phenolic resins may include cresol and novolac phenols.

Phenolic resins useful in embodiments disclosed herein include the reaction products of phenolic compounds, such as mono-functional phenols, di-functional phenols, and multi- or poly-functional phenols, and an aldehyde, such as formaldehyde. Examples of mono-functional phenols include phenol; cresol; 2-bromo-4-methylphenol; 2-allyphenol; 1,4-aminophenol; and the like. Examples of di-functional phenols (polyphenolic compounds) include phenolphthalane; biphenol; 4-4'-methylene-di-phenol; 4-4'-dihydroxybenzophenone; bisphenol-A; 1,8-dihydroxyanthraquinone; 1,6-dihydroxnaphthalene; 2,2'-dihydroxyazobenzene; resorcinol; fluorene bisphenol; and the like. Examples of tri-functional phenols include 1,3,5-trihydroxy benzene and the like. Polyvinyl phenol may also be a suitable phenolic resin. Phenolic resins are disclosed in, for example, U.S. Pat. No. 6,207,786.

Phenolic resins used in some embodiments may have a low formaldehyde to phenol ratio. For example, a two part system having a long shelf and pot life, using formaldehyde-free curing technology and being non-corrosive to dies, having a low solvent content and generating no water cure may be used. For example, the phenolic resins disclosed in U.S. Patent Application Publication Nos. 20050009980 and 20050054787 may be used.

Cyanate Ester Based Resins

Cyanate ester resins useful in embodiments disclosed herein may include one or more compounds of the general formula $NCOAr(Y_xAr_m)_qOCN$ and oligomers and/or polycyanate esters and combinations thereof wherein each Ar is independently a single or fused aromatic or substituted aromatics and combinations thereof and therebetween nucleus linked in the ortho, meta and/or para position; x is an integer from 0 to 2; and m and q are each independently an integer from 0 to 5. Y is a linking unit selected from the group consisting of oxygen, carbonyl, sulphur, sulphur oxides, chemical bond, aromatic linked in ortho, meta and/or para positions and/or $CR_1R_2$, $P(R_3R_4R_4'R_5)$, or $Si(R_3R_4R_4'R_6)$. $R_1$ and $R_2$ are independently hydrogen, halogenated alkanes, such as the fluorinated alkanes, and/or substituted aromatics and/or hydrocarbon units wherein said hydrocarbon units are singularly or multiply linked and consist of up to 20 carbon atoms for each $R_1$ and/or $R_2$. $R_3$ is alkyl, aryl, alkoxy or hydroxyl. $R'_4$ may be equal to $R_4$ and has a singly linked oxygen or chemical bond. $R_5$ has a doubly linked oxygen or chemical bond. $R_5$ and $R_6$ are defined similar to $R_3$ above. Optionally, the thermoset can consist essentially of cyanate esters of phenol/formaldehyde derived novolacs or dicyclopentadiene derivatives thereof, an example of which is XU71787 sold by the Dow Chemical Company, Midland, Mich.

In one embodiment disclosed herein, the cyanate ester may include bis(4-cyanatophenyl)methane bis(3-methyl-4-cyanatophenyl)methane, bis(3-ethyl-4-cyanatophenyl)methane, bis(3,5-dimethyl-4-cyanatophenyl)methane, 1,1-bis(4-cyanatophenyl)ethane, 2,2-bis(4-cyanatophenyl)propane, 2,2-bis(4-cyanatophenyl)1,1,1,3,3,3-hexafluoropropane, di(4-cyanatophenyl)ether, di(4-cyanatophenyl)thioether, 4,4-dicyanatobiphenyl, 1,3-bis(4-cyanatophenyl-1-(1-methylethylidene))benzene, 1,4-bis(4-cyanatophenyl-1-(1-methylethylidene))benzene and resorcinol dicyanate. Other cyanate esters may include the cyanate ester of phenol formaldehyde novolak, cyanate ester of phenol dicyclopentadiene novolak, 1,1,1-tris(4-cyanatophenyl)ethane.

Cyanate ester prepolymers that may be used in the present invention are prepolymers produced by partial curing of the cyanate ester in the presence or absence of a catalyst. A typical example of such a cyanate ester prepolymer is partially cured bis(3,5-dimethyl-4-cyanatophenyl)methane, sold under the tradename AROCY M-20 by Ciba. Other cyanate esters are described in, for example, U.S. Pat. Nos. 7,115,681, 7,026,411, 6,403,229 and 6,194,495, each of which are incorporated herein by reference.

Curing Agent/Hardener

Hardeners and curing agents may be provided for promoting the cure of the above described thermosetting resins. For example, a hardener or curing agent may be provided for promoting crosslinking of the epoxy resin composition to form a polymer composition. The hardeners and curing agents described herein may be used individually or as a mixture of two or more.

Curing agents may include primary and secondary polyamines and their adducts, anhydrides, and polyamides. For example, polyfunctional amines may include aliphatic amine compounds such as diethylene triamine (D.E.H. 20, available from The Dow Chemical Company, Midland, Mich.), triethylene tetramine (D.E.H. 24, available from The Dow Chemical Company, Midland, Mich.), tetraethylene pentamine (D.E.H. 26, available from The Dow Chemical Company, Midland, Mich.), as well as adducts of the above amines with epoxy resins, diluents, or other amine-reactive compounds. Aromatic amines, such as metaphenylene diamine and diamine diphenyl sulfone, aliphatic polyamines, such as amino ethyl piperazine and polyethylene polyamine, and aromatic polyamines, such as metaphenylene diamine, diamino diphenyl sulfone, and diethyltoluene diamine, may also be used.

Anhydride curing agents may include, for example, nadic methyl anhydride, hexahydrophthalic anhydride, trimellitic anhydride, dodecenyl succinic anhydride, phthalic anhydride, methyl hexahydrophthalic anhydride, tetrahydrophthalic anhydride, and methyl tetrahydrophthalic anhydride, among others.

The hardener or curing agent may include a phenol-derived or substituted phenol-derived novolac or an anhydride. Non-limiting examples of suitable hardeners include phenol novolac hardener, cresol novolac hardener, dicyclopentadiene phenol hardener, limonene type hardener, anhydrides, and mixtures thereof.

In some embodiments, the phenol novolac hardener may contain a biphenyl or naphthyl moiety. The phenolic hydroxy groups may be attached to the biphenyl or naphthyl moiety of the compound. This type of hardener may be prepared, for example, according to the methods described in EP915118A1. For example, a hardener containing a biphenyl moiety may be prepared by reacting phenol with bismethoxymethylene biphenyl.

In other embodiments, curing agents may include dicyandiamide and diaminocyclohexane. Curing agents may also include imidazoles, their salts, and adducts. These epoxy curing agents are typically solid at room temperature. Examples of suitable imidazole curing agents are disclosed in EP906927A1. Other curing agents include aromatic amines, aliphatic amines, anhydrides, and phenols.

In some embodiments, the curing agents may be an amino compound having a molecular weight up to 500 per amino group, such as an aromatic amine or a guanidine derivative. Examples of amino curing agents include 4-chlorophenyl-N, N-dimethyl-urea and 3,4-dichlorophenyl-N,N-dimethyl-urea.

Other examples of curing agents useful in embodiments disclosed herein include: 3,3'- and 4,4'-diaminodiphenylsulfone; methylenedianiline; bis(4-amino-3,5-dimethylphenyl)-1,4-diisopropylbenzene available as EPON 1062 from Shell Chemical Co.; and bis(4-aminophenyl)-1,4-diisopropylbenzene available as EPON 1061 from Shell Chemical Co.

Thiol curing agents for epoxy compounds may also be used, and are described, for example, in U.S. Pat. No. 5,374,668. As used herein, "thiol" also includes polythiol or polymercaptan curing agents. Illustrative thiols include aliphatic thiols such as methanedithiol, propanedithiol, cyclohexanedithiol, 2-mercaptoethyl-2,3-dimercaptosuccinate, 2,3-dimercapto-1-propanol(2-mercaptoacetate), diethylene glycol bis(2-mercaptoacetate), 1,2-dimercaptopropyl methyl ether, bis(2-mercaptoethyl)ether, trimethylolpropane tris (thioglycolate), pentaerythritol tetra(mercaptopropionate), pentaerythritol tetra(thioglycolate), ethyleneglycol dithioglycolate, trimethylolpropane tris(beta-thiopropionate), tris-mercaptan derivative of tri-glycidyl ether of propoxylated alkane, and dipentaerythritol poly(beta-thiopropionate); halogen-substituted derivatives of the aliphatic thiols; aromatic thiols such as di-, tris- or tetra-mercaptobenzene, bis-, tris- or tetra-(mercaptoalkyl)benzene, dimercaptobiphenyl, toluenedithiol and naphthalenedithiol; halogen-substituted derivatives of the aromatic thiols; heterocyclic ring-containing thiols such as amino-4,6-dithiol-sym-triazine, alkoxy-4,6-dithiol-sym-triazine, aryloxy-4,6-dithiol-sym-triazine and 1,3,5-tris(3-mercaptopropyl) isocyanurate; halogen-substituted derivatives of the heterocyclic ring-containing thiols; thiol compounds having at least two mercapto groups and containing sulfur atoms in addition to the mercapto groups such as bis-, tris- or tetra(mercaptoalkylthio) benzene, bis-, tris- or tetra(mercaptoalkylthio)alkane, bis (mercaptoalkyl) disulfide, hydroxyalkylsulfidebis (mercaptopropionate), hydroxyalkylsulfidebis (mercaptoacetate), mercaptoethyl ether bis (mercaptopropionate), 1,4-dithian-2,5-diolbis (mercaptoacetate), thiodiglycolic acid bis(mercaptoalkyl ester), thiodipropionic acid bis(2-mercaptoalkyl ester), 4,4'-thiobutyric acid bis(2-mercaptoalkyl ester), 3,4-thiophenedithiol, bismuththiol and 2,5-dimercapto-1,3,4-thiadiazol.

Aliphatic polyamines that are modified by adduction with epoxy resins, acrylonitrile, or (meth)acrylates may also be utilized as curing agents. In addition, various Mannich bases can be used. Aromatic amines wherein the amine groups are directly attached to the aromatic ring may also be used.

The suitability of the curing agent for use herein may be determined by reference to manufacturer specifications or routine experimentation. Manufacturer specifications may be used to determine if the curing agent is an amorphous solid or a crystalline solid at the desired temperatures for mixing with the liquid or solid epoxy. Alternatively, the solid curing agent may be tested using simple crystallography to determine the amorphous or crystalline nature of the solid curing agent and the suitability of the curing agent for mixing with the epoxy resin in either liquid or solid form.

In some embodiments, the hardener may be used at a concentration to achieve a molar ratio of the respective reactive groups (thermoset resin to hardener) between about 0.2 and about 5; between about 0.5 and 2 in other embodiments; between about 0.8 and 1.25 in other embodiments; and between about 0.9 and 1.1 in yet other embodiments.

Chain Extenders

Chain extenders may be used as an optional component in compositions described herein. Compounds which may be used in embodiments of the curable compositions disclosed herein as a chain extender include any compound having an average of about 2 hydrogen atoms per molecule which are reactive with vicinal epoxy groups. In some embodiments, dihydric and polyhydric phenolic compounds may be used, including, for example, xanthenes, phthaleins and sulfonphthaleins having two phenolic hydroxyl groups.

In some embodiments, chain extenders may include phenolic hydroxyl-containing compounds such as, for example, resorcinol, catechol, hydroquinone, bisphenol A, bisphenol K, bisphenol S, tetramethylbisphenol A, tetratertiarybutylbisphenol A, tetrabromobisphenol A, phenolphthalein, phenolsulfonphthalein, fluorescein, 4,4'-dihydroxybiphenyl, 3,5, 3',5'-tetramethyl-4,4'-dihydroxybiphenyl, 3,5,3',5'-tetrabromodihydroxybiphenyl, 3,5,3',5'-tetramethyl-2,6,2', 6'-tetrabromo-4,4'-dihydroxybiphenyl, reaction products of dicyclopentadiene or oligomers thereof and a phenolic compound, mixtures thereof and the like. Other suitable chain extenders may include, for example, aniline, toluidine, butylamine, ethanolamine, N,N'-dimethyl phenylene diamine, phthalic acid, adipic acid, fumaric acid, 1,2-dimercapto-4-methylbenzene, diphenyloxide dithiol, 1,4-butanedithiol, mixtures thereof and the like.

In other embodiments, the chain extender may be a nitrogen-containing monomer for example, an isocyanate, and amine or amide. In some embodiments, chain extenders may include epoxy-polyisocyanate compounds as described in WO 99/00451 and U.S. Pat. No. 5,112,932, each of which are incorporated herein by reference. Isocyanate compounds useful as chain extenders include, for example MDI, TDI and isomers thereof.

The nitrogen-containing chain extender may also be, for example an amine- or amino amide-containing compound which forms epoxy-terminated amine compounds having two N—H bonds capable of reacting with an epoxy group. Amine-containing chain extenders include, for example, mono-primary amines of the general formula R—$NH_2$ wherein R is alkyl, cycloalkyl or aryl moieties; di-secondary amines of the general formula R—NH—R'—NH—R" wherein R, R' and R" are alkyl, cycloalkyl or aryl moieties; and heterocyclic di-secondary amines wherein one or both of the N atoms is part of a nitrogen containing heterocyclic compound. Examples of amine-containing chain extender may include 2,6-dimethyl cyclohexylamine or 2,6-xylidine (1-amino-2,6-dimethylbenzene). Aromatic diamines may be used in other embodiments, such as, for example, with 3,3'-dichloro-4,4'-diaminodiphenyl methane or 4,4'-methylenebis(3-chloro-2,6-diethylaniline) and 3,3-dimethyl-4,4'-diaminodiphenyl.

Amino amide-containing compounds useful as chain extenders include, for example, derivatives of carboxylic acid amides as well as derivatives of sulfonic acid amides having additionally one primary or two secondary amino groups. Examples of such compounds include amino-aryl carboxylic acid amides and amino-arylsulfonamides, such as sulfanilamide (4-amino benzenesulfonamide) and anthranilamide(2-aminobenzamide).

The amount of the chain extender may be used, in some embodiments, in an amount from 1 to 40 weight percent, based on the epoxy resin. In other embodiments, the chain extender may be used in an amount ranging from 2 to 35 weight percent; from 3 to 30 weight percent in other embodiments; and from 5 to 25 weight percent in yet other embodiments, each based on the amount of epoxy resin.

Solvent

Another optional component, which may be added to the curable epoxy resin composition, is a solvent or a blend of solvents. The solvent used in the epoxy resin composition may be miscible with the other components in the resin composition. The solvent used may be selected from those typically used in making electrical laminates. Examples of suitable solvents employed in the present invention include, for example, ketones, ethers, acetates, aromatic hydrocarbons, cyclohexanone, dimethylformamide, glycol ethers, and combinations thereof.

Solvents for the catalyst and the inhibitor may include polar solvents. Lower alcohols having from 1 to 20 carbon atoms, such as, for example, methanol, provide good solubility and volatility for removal from the resin matrix when prepregs are formed. Other useful solvents may include, for example, N,-methyl-2-pyrrolidone, dimethylsulfoxide, dimethylformamide, tetrahydrofuran, 1,2-propane diol, ethylene glycol and glycerine.

The total amount of solvent used in the curable epoxy resin composition generally may range from about 1 to about 65 weight percent in some embodiments. In other embodiments, the total amount of solvent may range from 2 to 60 weight percent; from 3 to 50 weight percent in other embodiments; and from 5 to 40 weight percent in yet other embodiments.

Catalyst

In some embodiments, a catalyst may be used to promote the reaction between the epoxy resin component and the curing agent or hardener. Catalysts may include, for example, an imidazole or a tertiary amine. Other catalysts may include tetraalkylphosphonium salts, tetraalkylammonium salts, and the like; benzyl dimethylamine; dimethyl aminomethyl phenol; and amines, such as triethylamine, imadazole derivatives, and the like.

Tertiary amine catalysts are described, for example, in U.S. Pat. No. 5,385,990, incorporated herein by reference. Illustrative tertiary amines include methyldiethanolamine, triethanolamine, diethylaminopropylamine, benzyldimethyl amine, m-xylylenedi(dimethylamine), N,N'-dimethylpiperazine, N-methylpyrrolidine, N-methyl hydroxypiperidine, N,N,N'N'-tetramethyldiaminoethane, N,N,N',N',N'-pentamethyldiethylenetriamine, tributyl amine, trimethyl amine, diethyldecyl amine, triethylene diamine, N-methyl morpholine, N,N,N'N'-tetramethyl propane diamine, N-methyl piperidine, N,N'-dimethyl-1,3-(4-piperidino)propane, pyridine and the like. Other tertiary amines include 1,8-diazobicyclo[5.4.0]undec-7-ene, 1,8-diazabicyclo[2.2.2]octane, 4-dimethylaminopyrridine, 4-(N-pyrrolidino)pyridine, triethyl amine and 2,4,6-tris(dimethylaminomethyl)phenol.

Catalysts may include imidazole compounds including compounds having one imidazole ring per molecule, such as imidazole, 2-methylimidazole, 2-ethyl-4-methylimidazole, 2-undecylimidazole, 2-heptadecylimidazole, 2-phenylimidazole, 2-phenyl-4-methylimidazole, 1-benzyl-2-methylimidazole, 2-ethylimidazole, 2-isopropylimidazole, 2-phenyl-4-benzylimidazole, 1-cyanoethyl-2-methylimidazole, 1-cyanoethyl-2-ethyl-4-methylimidazole, 1-cyanoethyl-2-undecylimidazole, 1-cyanoethyl-2-isopropylimidazole, 1-cyanoethyl-2-phenylimidazole, 2,4-diamino-6-[2'-methylimidazolyl-(1)']-ethyl-s-triazine, 2,4-diamino-6-[2'-ethyl-4-methylimidazolyl-(1)']-ethyl-s-triazine, 2,4-diamino-6-[2'-undecylimidazolyl-(1)']-ethyl-s-triazine, 2-methylimidazolium-isocyanuric acid adduct, 2-phenylimidazolium-isocyanuric acid adduct, 1-aminoethyl-2-methylimidazole, 2-phenyl-4,5-dihydroxymethylimidazole, 2-phenyl-4-methyl-5-hydroxymethylimidazole, 2-phenyl-4-benzyl-5-hydroxymethylimidazole and the like; and compounds containing 2 or more imidazole rings per molecule which are obtained by dehydrating above-named hydroxymethyl-containing imidazole compounds such as 2-phenyl-4,5-dihydroxymethylimidazole, 2-phenyl-4-methyl-5-hydroxymethylimidazole and 2-phenyl-4-benzyl-5-hydroxymethylimidazole; and condensing them by deformaldehyde reaction, e.g., 4,4'-methylene-bis-(2-ethyl-5-methylimidazole), and the like.

Catalysts that may be used with cyanate ester resins, for example, may include carboxylate salts, phenols, alcohols, amines, urea derivatives, imidazoles, and metal chelates. In some embodiments, the catalyst may include octoate, carboxylate, or acetylacetonate salts of zinc, cobalt, copper, manganese, iron, nickel, or aluminum.

Catalysts that may be used to form phenolic resins may include, for example, various amines and hydroxides, examples of which include caustic sodium hydroxide, triethylamine, ammonia, lithium hydroxide, ammonium hydroxide and triethanolamine.

In some embodiments, combinations of two or more catalyst may be used. In other embodiments, at least one catalyst used may react at a temperature greater than that of the curing agent used in the composition. For example, where a curing agent initiates reaction at a temperature of 150° C., the catalyst may initiate react at 180° C.

The concentration of catalyst used in curable compositions disclosed herein may be between about 10 ppm and about 5 percent by weight based on the total weight of thermosetting resin and hardener, if used; between about 100 ppm and 3 percent by weight in other embodiments; and between 1000 ppm and 2 percent by weight in yet other embodiments.

High Temperature Resistant Thermoplastics

High temperature resistant thermoplastics may be combined with the above described thermosetting resins to improve at least one of dampening ranges, performance at high temperatures, and processability. For example, high temperature resistant thermoplastics may include polyetherimides, polyphenylene ether, polyoxyphenylenes, polysulphone, syndiotactic polystyrene, polyaryl ether ketones, polycarbonates, acetals, polyimides, and polyarylene sulfides, among others.

Examples of polyphenylene ethers and a method for their production are described in, for example, U.S. Pat. No. 4,734,485. Examples of polyarylene sulfides are described in, for example, U.S. Pat. No. 5,064,884. Examples of polyaryl ether ketones are described in, for example, U.S. Pat. No. 5,122,588.

Polyetherimide resins may include, for example, the reaction product formed by melt polymerization of 2,2-bis[4-(3,4-dicarboxyphenoxy)phenyl]propane dianhydride with one or more of paraphenylene diamine and metaphenylene diamine, such as disclosed in U.S. Pat. No. 6,753,365. Other polyetherimides resins may include those described in, for example, U.S. Pat. Nos. 6,239,232, 6,403,684, and 6,011,122, among others. Other high temperature resistant thermoplastics are described in, for example, U.S. Pat. Nos. 6,548,608, 3,984,604, 6,894,102, 6,890,973, 6,875,804, 6,008,293, and 5,352,727, among others.

The high temperature resistant thermoplastic resin used in embodiments of the thermosetting compositions disclosed herein may be selected from any thermoplastic resin that does not undergo a thermal decomposition of more than about 5 weight percent at about 100° C. In other embodiments, the thermoplastic resin does not undergo a thermal decomposition of more than about 5 weight percent at about 150° C.; at about 200° C. in yet other embodiments.

The concentration of high temperature resistant thermoplastic resins may be between about 0.1 percent and 60 percent, based on the total weight of the thermosetting composition; between about 0.5 percent and 50 percent by weight in other embodiments; between about 1 percent and 40 percent by weight in other embodiments; between about 2 percent and about 30 percent by weight in other embodiments; and between about 5 percent and 20 percent by weight in yet other embodiments.

In some embodiments, the resulting thermoset dampener composition has distinct phases, including a thermoset resin phase and a high temperature thermoplastic resin phase. Compositions disclosed herein should maintain the concentration of high temperature thermoplastic resin below a maximum concentration, such that the cured thermoset resin forms the continuous phase. In some embodiments, the thermoplastic phase forms discretely dispersed particles within the thermoset network such that the size of the dispersed thermoplastic domains is less than about 100 microns; less than 50 microns in other embodiments; less than 20 microns in other embodiments; less than 10 microns in other embodiments; and less than 5 microns in yet other embodiments.

Optional Additives

The composition may also include optional additives and fillers conventionally found in thermoset or epoxy systems. For example, thermoset compositions and dampener materials disclosed in various embodiments may include toughening agents, curing inhibitors, wetting agents, colorants, processing aids, UV blocking compounds, fluorescent compounds, and other additives.

Additives and fillers may include silica, glass, talc, quartz, metal powders, titanium dioxide, wetting agents, pigments, coloring agents, mold release agents, coupling agents, flame retardants, ion scavengers, UV stabilizers, flexibilizing agents, and tackifying agents. Additives and fillers may also include fumed silica, aggregates such as glass beads, polytetrafluoroethylene, polyol resins, polyester resins, phenolic resins, graphite, molybdenum disulfide, abrasive pigments, viscosity reducing agents, boron nitride, mica, nucleating agents, and stabilizers, among others. Fillers and modifiers may be preheated to drive off moisture prior to addition to the epoxy resin composition. Additionally, these optional additives may have an effect on the properties of the composition, before and/or after curing, and should be taken into account when formulating the composition and the desired reaction product.

In other embodiments, compositions disclosed herein may include toughening agents. Toughening agents function by forming a secondary phase within the polymer matrix. This secondary phase is rubbery and hence is capable of crack growth arrestment, providing improved impact toughness. Toughening agents may include polysulfones, silicon-containing elastomeric polymers, polysiloxanes, and other rubber toughening agents known in the art.

Inorganic fillers used in embodiments disclosed herein may have at least one average dimension below about 1 mm; below about 100 microns in other embodiments; below about 50 microns in other embodiments; below 10 microns in other embodiments; above 2 nm in other embodiments; above 10 nm in other embodiments; above 20 nm in other embodiments; and above 50 nm in yet other embodiments.

In other embodiments, thermosetting compositions disclosed herein may include fibrous reinforcement materials, such as continuous and/or chopped fibers. The fibrous reinforcement material may include glass fibers, carbon fibers, or organic fibers such as polyamide, polyimide, and polyester. The concentration of fibrous reinforcements used in embodiments of the thermosetting compositions may be between about 1 percent to about 95 percent by weight, based on the total weight of the composition; between about 5 percent and 90 percent by weight in other embodiments; between about 10 percent and 80 percent in other embodiments; between about 20 percent and 70 percent in other embodiments; and between 30 percent and 60 percent in yet other embodiments.

In other embodiments, compositions disclosed herein may include nanofillers. Nanofillers may include inorganic, organic, or metallic, and may be in the form of powders, whiskers, fibers, plates or films. The nanofillers may be generally any filler or combination of fillers having at least one dimension (length, width, or thickness) from about 0.1 to about 100 nanometers. For example, for powders, the at least one dimension may be characterized as the grain size; for whiskers and fibers, the at least one dimension is the diameter; and for plates and films, the at least one dimension is the thickness. Clays, for example, may be dispersed in an epoxy resin-based matrix, and the clays may be broken down into very thin constituent layers when dispersed in the epoxy resin under shear. Nanofillers may include clays, organo-clays, carbon nanotubes, nanowhiskers (such as SiC), $SiO_2$, elements, anions, or salts of one or more elements selected from the s, p, d, and f groups of the periodic table, metals, metal oxides, and ceramics.

The concentration of any of the above described additives, when used in the thermosetting compositions described herein, may be between about 1 percent and 95 percent, based on the total weight of the composition; between 2 percent and 90 percent in other embodiments; between 5 percent and 80 percent in other embodiments; between 10 percent and 60 percent in other embodiments, and between 15 percent and 50 percent in yet other embodiments.

Substrates

The substrate or object is not subject to particular limitation. As such, substrates may include metals, such as stainless steel, iron, steel, copper, zinc, tin, aluminium, alumite and the like; alloys of such metals, and sheets which are plated with such metals and laminated sheets of such metals. Substrates may also include polymers, glass, and various fibers, such as, for example, carbon/graphite; boron; quartz; aluminum oxide; glass such as E glass, S glass, S-2 GLASS® or C glass; and silicon carbide or silicon carbide fibers containing titanium. Commercially available fibers may include: organic fibers, such as KEVLAR; aluminum oxide-containing fibers, such as NEXTEL fibers from 3M; silicon carbide fibers, such as NICALON from Nippon Carbon; and silicon carbide fibers containing titanium, such as TYRRANO from Ube. In some embodiments, the substrate may be coated with a compatibilizer to improve the adhesion of the curable or cured composition to the substrate.

In selected embodiments, the curable compositions described herein may be used as coatings for substrates that cannot tolerate high temperatures. In other embodiments, the curable compositions may be used with substrates whose dimensions and shape make it difficult to apply homogeneous heating, such as windmill blades, for example.

Composites and Coated Structures

The curable compositions and the composites described herein may be produced conventionally, accounting for the alteration in the epoxy resin compositions before they are cured as described above, including the stoichiometric excess of epoxy resin and the temperature stable catalyst. In some embodiments, composites may be formed by curing the curable compositions disclosed herein. In other embodiments, composites may be formed by applying a curable epoxy resin composition to a substrate or a reinforcing material, such as by impregnating or coating the substrate or reinforcing material, and curing the curable composition.

The above described curable compositions may be in the form of a powder, slurry, or a liquid. After a curable composition has been produced, as described above, it may be disposed on, in, or between the above described substrates, before, during, or after cure of the curable composition.

For example, a composite may be formed by coating a substrate with a curable composition. Coating may be performed by various procedures, including spray coating, curtain flow coating, coating with a roll coater or a gravure coater, brush coating, and dipping or immersion coating.

In various embodiments, the substrate may be monolayer or multi-layer. For example, the substrate may be a composite of two alloys, a multi-layered polymeric article, and a metal-coated polymer, among others, for example. In other various embodiments, one or more layers of the curable composition may be disposed on a substrate. For example, a substrate coated with a polyurethane-rich curable composition as described herein may additionally be coated with an epoxy resin-rich curable composition. Other multi-layer composites, formed by various combinations of substrate layers and curable composition layers are also envisaged herein.

In some embodiments, the heating of the curable composition may be localized, such as to avoid overheating of a temperature-sensitive substrate, for example. In other embodiments, the heating may include heating the substrate and the curable composition.

In one embodiment, the curable compositions, composites, and coated structures described above may be cured by heating the curable composition to a temperature sufficient to initiate reaction of the curing agent. During the initial cure, secondary hydroxyl groups may be formed as the curing agent reacts. Following at least partial reaction of the curing agent and epoxy, the temperature of the curable composition, composite, or coated structure may be increased to a temperature sufficient for the catalyst to catalyze the reaction of the secondary hydroxyl groups with the excess epoxy resin. In this manner, the stoichiometric excess of epoxy may be reacted without significant degradation of the epoxy thermoset.

In some embodiments, the additional crosslinking that forms during the reaction of the excess epoxy may decrease the bulk density of the epoxy thermoset. In other embodiments, the additional crosslinking may increase the fracture toughness of the epoxy thermoset. In yet other embodiments, the reaction of the stoichiometric excess of epoxy may avoid the deleterious effects that unreacted epoxy may have on the thermoset composition, as described in the prior art, resulting in a thermoset composition having one or more of adequate or improved heat resistance, solvent resistance, low moisture absorption, reflow reliability, electrical properties, glass transition temperature, and adhesion, among others.

Curing of the curable compositions disclosed herein may require a temperature of at least about 30° C., up to about 250° C., for periods of minutes up to hours, depending on the epoxy resin, curing agent, and catalyst, if used. In other embodiments, curing may occur at a temperature of at least 100° C., for periods of minutes up to hours. Post-treatments may be used as well, such post-treatments ordinarily being at temperatures between about 100° C. and 250° C.

In some embodiments, curing may be staged to prevent exotherms. Staging, for example, includes curing for a period of time at a temperature followed by curing for a period of time at a higher temperature. Staged curing may include two or more curing stages, and may commence at temperatures below about 180° C. in some embodiments, and below about 150° C. in other embodiments.

In some embodiments, curing temperatures may range from a lower limit of 30° C., 40° C., 50° C., 60° C., 70° C., 80° C., 90° C., 100° C., 110° C., 120° C., 130° C., 140° C., 150° C., 160° C., 170° C., or 180° C. to an upper limit of 250° C., 240° C., 230° C., 220° C., 210° C., 200° C., 190° C., 180° C., 170° C., 160° C., where the range may be from any lower limit to any upper limit.

The curable compositions disclosed herein may be useful in composites containing high strength filaments or fibers such as carbon (graphite), glass, boron, and the like. Composites may contain from about 30% to about 70%, in some embodiments, and from 40% to 70% in other embodiments, of these fibers based on the total volume of the composite.

Fiber reinforced composites, for example, may be formed by hot melt prepregging. The prepregging method is characterized by impregnating bands or fabrics of continuous fiber with a thermosetting epoxy resin composition as described herein in molten form to yield a prepreg, which is laid up and cured to provide a composite of fiber and thermoset resin.

Other processing techniques can be used to form composites containing the epoxy-based compositions disclosed herein. For example, filament winding, solvent prepregging, and pultrusion are typical processing techniques in which the uncured epoxy resin may be used. Moreover, fibers in the form of bundles may be coated with the uncured epoxy resin composition, laid up as by filament winding, and cured to form a composite.

The curable compositions and composites described herein may be useful as adhesives, structural and electrical laminates, coatings, castings, structures for the aerospace industry, as circuit boards and the like for the electronics industry, windmill blades, as well as for the formation of skis, ski poles, fishing rods, and other outdoor sports equipment. The epoxy compositions disclosed herein may also be used in electrical varnishes, encapsulants, semiconductors, general molding powders, filament wound pipe, storage tanks, liners for pumps, and corrosion resistant coatings, among others.

EXAMPLES

Examples A1 and A2

Examples A1 and A2 are prepared by mixing resins and hardeners, as indicated in Table 1, in suitable solvents at ambient temperatures. The thermosetting resin PN is a low molecular weight phenol novolac with a phenolic equivalent weight, PhEW, of 104; the hardener ZE is an oxazolidine of 5-ethyl-1-aza-3,7-dioxabicyclo[3.3.0]octane. For higher viscosity formulations, formulations are warmed up to a temperature between 60° C. and 80° C. to lower the viscosity for admixture of the components. The mixtures are degassed, and castings are prepared by pouring the formulations in open molds. The castings are then cured in a ventilated oven for 10 minutes at 150° C., 10 minutes at 180° C., and 10 minutes at 200° C. Following cure, the castings are allowed to cool to ambient temperature. Formulations and properties of the cured compositions, as measured using dynamic mechanical thermal analysis, are given in Table 1.

TABLE 1

|  | Example | |
| --- | --- | --- |
|  | A1 | A2 |
| Formulation |  |  |
| PN (g) | 68.5 | 65 |
| ZE (g) | 31.5 | 35 |
| Properties of the Cured Composition |  |  |
| Tα, measured by tan δ peak (° C.) | 202 | 235 |
| Height of tan δ peak | 0.36 | 0.28 |
| Width of tan δ peak at half-height (° C.) | 45 | 60 |

Examples A3 and A4

Examples A3 and A4 are prepared by mixing resins, hardeners, and catalysts as indicated in Table 2, in suitable solvents. Thermosetting epoxy resin E1 is a glycidyl ether of bisphenol A with an epoxy equivalent weight, EEW, of 180; thermosetting epoxy resin E2 is an epoxy novolac with an epoxy equivalent weight, EEW, of 180; triazine T1 is a triazine homopolymer of 2,2-bis(4-cyanatophenyl)propane; bis-maleimide B1 is a diphenylmethane-4,4'-bismaleimide; catalyst C1 is a zinc-bis(2-ethylhexanoate) in MEK (methyl ethyl ketone) solution. The formulations are warmed up to a temperature between 100° C. and 120° C. to lower the viscosity for admixture of the components. The castings are prepared by pouring the formulations in open molds. The castings are then cured in a ventilated oven for 60 minutes at 170° C. and 90 minutes at 200° C. Following cure, the castings are allowed to cool to ambient temperature. Formulations and properties of the cured compositions, as measured using dynamic mechanical thermal analysis, are given in Table 2.

TABLE 2

|  | Example | |
| --- | --- | --- |
|  | A3 | A4 |
| Formulation |  |  |
| Epoxy Resin E1 (g) | 38.4 | 0 |
| Epoxy Resin E2 (g) | 0 | 38.4 |
| Triazine T1 (g) | 36.9 | 36.9 |

TABLE 2-continued

|  | Example | |
| --- | --- | --- |
|  | A3 | A4 |
| Bismaleimide B1 (g) | 24.5 | 24.5 |
| Catalyst C1 (10% non volatiles in MEK) (g) | 0.2 | 0.2 |
| Properties of the Cured Composition |  |  |
| Tα, measured by tan δ peak (° C.) | 257 | 262 |
| Height of tan δ peak | 0.34 | 0.28 |
| Width of tan δ peak at half-height (° C.) | 46 | 61 |

Example A5

Example A5 is prepared by mixing resins, hardeners, additives, and catalysts as indicated in Table 3. Thermosetting epoxy resin E2 is a glycidyl ether of bisphenol A with an epoxy equivalent weight, EEW, of 187; thermosetting epoxy resin E3 is 3,4-Epoxycyclohexylmethyl-3,4-epoxycyclohexane carboxylate with an epoxy equivalent weight, EEW, of 135; hardener H1 is methyl hexahydrophthalic anhydride with an anhydride equivalent weight, AnhEW, of 168; hardener H2 is hexahydrophthalic anhydride with an anhydride equivalent weight, AnhEW, of 154; catalyst C2 is 1-cyanoethyl-2-ethyl-4-methylimidazole; and filler F1 is a crystalline silica filler with a median particles size of about 16 micron. The formulation is warmed up to a temperature of about 60° C. to lower the viscosity for admixture of the components. The mixture is degassed for 15 minutes at 60° C., and castings are prepared by pouring the formulation in an open mold. The castings are then cured in a ventilated oven for 95 minutes at 65° C., 75 minutes at 75° C., 80 minutes at 115° C., and 60 minutes at 150° C. Following cure, the castings are allowed to cool to ambient temperature. Formulation and properties of the cured compositions, as measured using dynamic mechanical thermal analysis, are given in Table 3.

TABLE 3

|  | Example A5 |
| --- | --- |
| Formulation |  |
| Epoxy Resin E2 (g) | 6.1 |
| Epoxy Resin E3 (g) | 18.5 |
| Hardener H1 (g) | 20.8 |
| Hardener H2 (g) | 1.1 |
| Catalyst C2 (g) | 0.2 |
| Silica Filler F1 (g) | 53.3 |
| Properties of the Cured Composition |  |
| Tα, measured by tan δ peak (° C.) | 178 |
| Height of tan δ peak | 0.55 |
| Width of tan δ peak at half-height (° C.) | 40 |

Example A6

50 g of polypropyleneglycol of average molecular weight about 425, pre-dried over molecular sieves, plus 123 grams of anhydrous dichloromethane are placed in a five-necked flask of sufficient capacity fitted with a mechanical stirrer, reflux condenser, thermometer, screw-type feed funnel for powders and an inlet feed tube for dry nitrogen, which is streamed, slowly during all the succession of operations. The temperature is then adjusted to and maintained at 20° C. to 25° C. during the entire process. 11.36 g of powdered potassium iodide dried under vacuum at 40° C. to 50° C. are then fed gradually into the flask under stirring. The mixture is stirred until it is clear. Most of the solvent is then removed from the resulting solution by distillation under atmospheric pressure at a temperature not exceeding 50° C.-60° C. The residual dichloromethane is then carefully eliminated with a rotary evaporator under reduced pressure and again at 50° C.-60° C. The catalyst prepared in this manner is a yellowish clear oily liquid at 15° C.-25° C.

Figure 1:
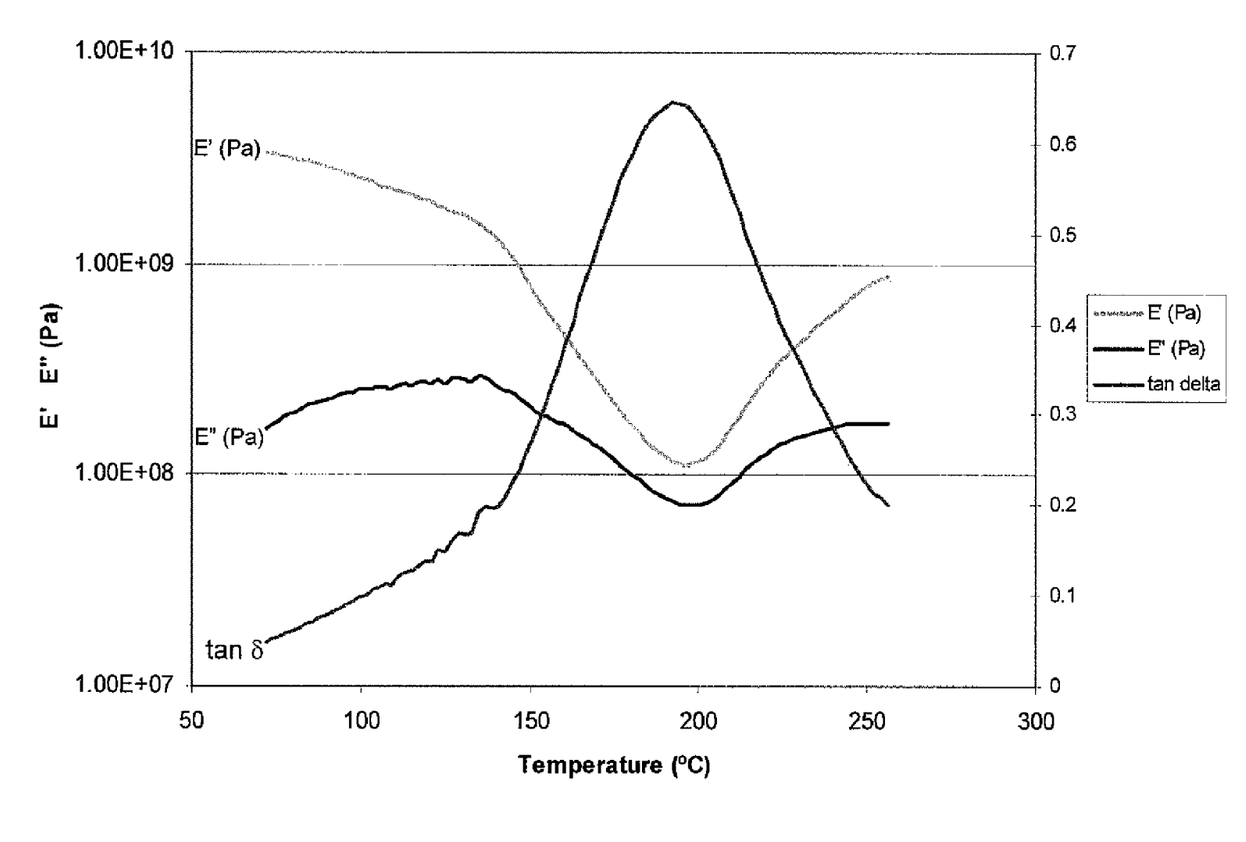
FIG. 1 presents Dynamic Mechanical Thermal Analysis results for a resin prepared according to embodiments disclosed herein.

0.6 grams of the above-formed potassium iodide catalyst is mixed with 35.3 grams of a diglycidyl ether of bisphenol A having an epoxy equivalent weight, EEW, of about 185 and 58.5 grams of a methylene di-isocyanate having a molecular weight of about 143. The mixture is warmed up to a temperature between 100° C. and 120° C. to lower the viscosity for admixture of the components. The castings are prepared by pouring the formulation in an open mold. The castings are then cured in a ventilated oven for approximately 2 hours at 150° C. Following cure, the castings are allowed to cool to ambient temperature. Formulations and properties of the cured compositions, as measured using dynamic mechanical thermal analysis, are given in Table 4 and FIG. 1.

TABLE 4

| Properties of the Cured Composition |  |
| --- | --- |
| Tα, measured by tan δ peak (° C.) | 200 |
| Height of tan δ peak | 0.65 |
| Width of tan δ peak at half-height (° C.) | 40 |

Advantageously, embodiments disclosed herein may provide for efficient dampening of vibrations at high temperatures. Compositions described herein may include both high glass transition temperatures and high dampening factors. When disposed on substrates for use in high temperature environments, the dampener compositions described herein may effectively dampen the vibrations, resulting in one or more of increased part life and improved part performance, among other benefits.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A process for dampening vibrations in an article, comprising:
    (a) disposing a thermoset composition on a substrate of the article to form a composite; the
    thermoset composition having:
        a glass transition temperature of 150° C. or greater,
        a tan δ peak of 0.2 or greater, and
        a tan δ peak width measured at half-height larger than about 40° C.,
        each as measured by dynamic mechanical thermal analysis (DMTA) at a frequency of 1 Hz; and
    (b) exposing the composite to vibrations at temperatures of 100° C. or greater.
2. The process of claim 1, further comprising:
    (c) curing a curable composition to form the thermoset composition on the substrate of the article to form the composite;
    wherein the curable composition comprises:
        at least one thermosetting resin; and
        a hardener.

3. The process of claim 2, comprising admixing the at least one thermosetting resin and the hardener to form the curable composition.

4. The process of claim 3, further comprising admixing at least one of a catalyst, an inorganic filler, a fibrous reinforcement, a high temperature resistant thermoplastic resin, a solvent, and an additive to form the curable composition.

5. The process of claim 4, wherein the high temperature resistant thermoplastic resin is selected from the group consisting of polyetherimides, a polyphenylene ether, a polyoxyphenylene, a polysulphone, a syndiotactic polystyrene, a polyaryl ether ketone, a polycarbonate, an acetal, a polyimide, and a polyarylene sulfide.

6. The process of claim 2, wherein the thermosetting resin is selected from the group consisting of an epoxy resin, a phenolic resin, a vinylic resin, and a cyanate ester-based resin.

* * * * *